3,515,760
ISOMERIZATION PROCESS
Darrel Dean Wild, La Place, La., assignor to E. I. du Pont de Nemours and Company, Wilmington, Del., a corporation of Delaware
No Drawing. Filed Apr. 10, 1968, Ser. No. 720,385
Int. Cl. B01j *11/00;* C07c *21/04*
U.S. Cl. 260—654                              1 Claim

ABSTRACT OF THE DISCLOSURE

A process for the isomerization of 3,4-dichlorobutene-1 to 1,4-dichlorobutene-2, or vice versa, by heating the butene compound in the presence of (1) a metal salt complexed with an organic compound and (2) greater than 1% by weight of the total mixture of the organic compound used to complex the metal salt in uncomplexed form.

---

This invention relates to an improved process for the isomerization of 3,4-dichlorobutene-1 to 1,4-dichlorobutene-2, or vice versa.

It is known in the art to isomerize 3,4-dichlorobutene-1 to 1,4-dichlorobutene-2 by heating the compound in the presence of a metal chloride such as iron chloride, tin chloride, zinc chloride and the like. See U.S. Pat. No. 2,242,084. It is further known in the art to isomerize 1,4-dichlorobutene-2 to 3,4-dichlorobutene-1 by heating the 1,4 compound in the presence of a complexed metal salt such as the complex formed by dissolving palladium chloride in benzonitrile. See Japanese Pat. No. 3,613/67.

The present invention is based upon the discovery that faster reaction rates are obtained under similar conditions if the organic compound used to complex the metal salt is present in the mixture being treated in an amount in excess of that required to form the complex. Specifically, the organic compound should be present in an amount greater than about 1% by weight of the total mixture. The organic compound may be present at concentrations as high as 50% by weight of the total mixture or even higher, but at such concentrations the efficiency of the reaction is less due to dilution of the butene. Organic compounds that will complex with metallic salts and are soluble in the butene containing mixture are operable. Included within the class of compounds which are useful as complexing agents are the nitriles, alcohols, ketones, ethers and esters. Because the products after isomerization will usually be separated by distillation, it is preferred that the organic complexing compound have an atmospheric boiling point higher than that of the desired dichlorobutene isomer. Specific members of this class of complexing agents include acetonitrile, heptane nitrile, benzonitrile, adiponitrile, glutaronitrile, pimelonitrile, butyl alcohol, octyl alcohol, glycerol, ethylene glycol diisobutyl, phthalate, butyl acetate, ethyl acetate, methyl isobutyl ketone, diisobutyl ketone, methyl ethyl ketone, acetone, methoxyethanol, 3,3′oxydipropyl nitrile, dihexyl ether, and p-chloroanisol. Particularly desirable complexing compounds are adiponitrile and benzonitrile.

Among the inorganic salts that may be employed are those of groups III–A, IV–A, I–B, II–B, VI–B, VII–B, and VIII of the Periodic chart of the Elements as set forth on pages 448 and 449 of Handbook of Chemistry and Physics, 41st Edition 1959–1960, Chemical Rubber Publishing Company, Cleveland, Ohio, for example, iron, palladium, zinc, aluminum, copper, nickel, cobalt, chromium, platinum, mercury, manganese and tin. A preferred class of salts are the halides, especially the chlorides, although the sulfates are also satisfactory. Particularly preferred salts are cuprous chloride, zinc chloride, palladium chloride, mercuric chloride and cuprous sulfate. Stannous chloride, cobaltous chloride, and chromous chloride cause the reaction to proceed at a slow rate.

The complex salts are produced by methods known in the art, for example see Japanese Pat. 3,613/67, by heating the salt and the organic complexing agent together.

The complexed salt is generally used in the isomerization reaction in amounts of about 0.01% to about 5% by weight of the composition containing the dichlorobutene.

The isomerization reaction is relatively slow even using the improved process of the present invention. Therefore, the reaction mixture, i.e., the composition containing the dichlorobutene, the complexed metal salt and the organic compound used to complex the salt, is heated for a relatively long period of time in the range of about 5 to 20 hours to achieve an equilibrium mixture. If, however, the heating is carried out as part of a distillation process, the holdup time in the reactor for some of the isomerized compound will be much less than thirty minutes. Normally, the temperature of the isomerization reaction is about 60° C. to about 160° C. The reactor and the distillation column may be operated as a single unit or as two separate units.

If the isomerization reaction is that of converting 1,4-dichlorobutene-2 to 3,4-dichlorobutene-1, the composition containing greater than an equilibrium concentration of 1,4-dichlorobutene-2 at the conditions (temperature) at which the reaction is to take place, is fed to the reactor containing complexed metal salt and at least about 1% organic complexing agent. The mixture is heated and after the reaction has proceeded to the desired extent, the reaction material containing an increased proportion of 3,4-dichlorobutene-1 is taken off overhead to a distillation column. The reactor and/or the distillation column may be operated at reduced pressure if desired. This 3,4-dichlorobutene-1 rich mixture is then fractionated, usually by distillation, and the fraction containing more 1,4-dichlorobutene-2 is returned to the reactor. If, on the other hand, the isomerization reaction is that of converting 3,4 - dichlorobutene-1 to 1,4 - dichlorobutene - 2, the composition containing 3,4 - dichlorobutene - 1 in an amount greater than equilibrium concentration at the selected reaction temperature is fed to the reactor containing the complexed metal salt and at least about 1% of the complexing compound. The mixture is heated and after the reaction has proceeded to the desired extent, the reaction material containing an increased proportion of 1,4-dichlorobutene-2 is taken off overhead to a distillation column. This 1,4-dichlorobutene-2 rich mixture is then fractionated, usually by distillation and the fraction containing more 3,4-dichlorobutene-1 is returned to the reactor.

In the following examples which illustrate the inven-

EXAMPLE 1

The cuprous chloride·benzonitrile complex was prepared by dissolving 10 g. of cuprous chloride in 50 ml. of benzonitrile at 105° C. The solution was then allowed to cool to room temperature and the excess benzonitrile was decanted from the crystals. The crystals were dried under reduced pressure and low heat. These dried crystals were then used in isomerizations of 3,4-dichlorobutene-1.

The isomerizations were conducted with 0.18 g. of the cuprous chloride·benzonitrile complex in a 100 ml. round bottom flask which contained a small Teflon (R) coated magnetic stirring bar and 25 ml. of pure 3,4-dichlorobutene-1. The flask was then placed in the 105° C. oil bath which also contained a magnetic stirring bar. Both stirring bars were driven at about 100 r.p.m. by a magnetic stirrer. The first sample was taken when the flask contents reached 103° C. This and later samples were run by gas chromatography.

| Time, minutes: | 3,4-dichlorobutene-1 concentration (on dichlorobutene basis), percent |
|---|---|
| 0 (first sample) | 93.3 |
| 30 | 89.5 |
| 76 | 82.5 |
| 134 | 75.3 |

This process was rerun in the same manner and under the same conditions except 20 ml. of pure 3,4-dichlorobutene-1 and 5 ml. of benzonitrile were used in place of the 25 ml. of 3,4-dichlorobutene-1. The first sample was again taken when the flask contents reached 103° C.

| Time, minutes: | 3,4-dichlorobutene-1 concentration (on dichlorobutene basis), percent |
|---|---|
| 0 (first sample) | 87.0 |
| 20 | 61.5 |
| 50 | 43.0 |
| 83 | 34.4 |
| 140 | 27.2 |

In both processes, substantially all of the 3,4-dichorobutene-1 which reacted was converted to 1,4-dichlorobutene-2, thus illustrating the faster reaction rate when the complexing agent is present in excess of the amount necessary to complex the salt.

EXAMPLE 2

The palladium chloride·benzonitrile complex was prepared by dissolving 2.5 g. of the dihydrate of palladium chloride in 30 ml. of benzonitrile at 105° C. The solution was then cooled to 0° C. and the excess benzonitrile was decanted from the crystals. The crystals were dried under reduced pressure and low heat. These dried crystals were then used in isomerizations of 3,4-dichlorobutene-1.

The example was conducted with 0.36 g. of the palladium chloridebenzonitrile complex in each of two 100 ml. Erlenmeyer flasks. The flasks were capped with rubber serum stoppers and evacuated through a hypodermic needle inserted through the stopper. Using a hypodermic syringe, 25 ml. of pure 3,4-dichlorobutene-1 was added to one flask and 23 ml. of ure 3,4-dichlorobutene-1 and 2 ml. of benzonitrile were added to the other flask. Both flasks were placed in the 105±1° C. bath for 65 hours.

The contents of the flask containing only the complex and 3,4-dichlorobutene-1 were transferred to the previously described 100 ml. round bottom flask (Example 1) and placed in the 105° C. oil bath. When the flask contents reached 105° C., 25 ml. of pure 3,4-dichlorobutene-1 was added. The first sample was taken five minutes after the 25 ml. of 3,4-dichlorobutene-1 was added.

| Time, minutes: | 3,4-dichlorobutene-1 concentration (on dichlorobutene basis), percent |
|---|---|
| 0 (5 minutes after addition) | 61.2 |
| 20 | 58.1 |
| 40 | 55.1 |
| 79 | 50.6 |
| 134 | 44.8 |
| 184 | 40.7 |

The isomerization was rerun exactly the same way with the flask which contained 23 ml. of 3,4-dichlorobutene-1 and 2 ml. of benzonitrile. Results were as follows:

| Time, minutes: | 3,4-dichlorobutene-1 concentration (on dichlorobutene basis), percent |
|---|---|
| 0 (5 minutes after addition) | 62.6 |
| 20 | 58.3 |
| 40 | 54.3 |
| 79 | 47.8 |
| 158 | 38.5 |

Substantially all of the 3,4-dichlorobutene-1 was converted to another product 1,4-dichlorobutene-2, thus illustrating the faster reaction rate when the complexing agent is present in excess of the amount necessary to complex the salt.

EXAMPLE 3

A 500 ml. still pot was charged with 3 g. of CuCl and 150 ml. of adiponitrile, and attached to a 1-inch diameter, 20 tray Oldershaw column. A pressure of 80 mm. of mercury was established and heat was applied to the still pot to dissolve the cuprous chloride. Then 150 ml. of dichlorobutene feed was added to the still pot through a feed funnel attached to a side-arm of the still pot. The composition of the dichlorobutene feed as analyzed by gas chromatograph was:

| | Percent |
|---|---|
| Impurities | 0.6 |
| 3,4-dichlorobutene-1 | 42.4 |
| Cis-1,4-dichlorobutene-2 | 15.6 |
| Trans-1,4-dichlorobutene-2 | 41.6 |

Reflux was established on the column and dichlorobutene was taken overhead at such a rate that the temperature did not exceed 67° C. Additional dichlorobutene feed (850 ml.) was added to the still pot during the next 5 hours in 10 ml. increments to replace the amount distilled overhead. Still pot temperatures remained between 110 and 115° C. When feed addition was complete, dichlorobutene was taken overhead until a still pot temperature of 120° C. was obtained; then the pressure was slowly reduced to 10 mm. of Hg to remove as much dichlorobutene as possible from the still pot. A total of 970 ml. of dichlorobutene was taken overhead during the experiment. The composition as analyzed by gas chromatograph was:

| | Percent |
|---|---|
| Impurities | 0.8 |
| 3,4-dichlorobutene-1 | 91.1 |
| Cis-1,4-dichlorobutene-2 | 4.9 |
| Trans-1,4-dichlorobutene-2 | 3.2 |

What is claimed is:
1. An isomerization process in which a first composition containing (1) 3,4-dichlorobutene-1 and (2) 1,4-dichlorobutene-2, said 1,4-dichlorobutene-2 being at a concentration greater than equilibrium relative to 3,4-dichlorobutene-1 at the conditions at which the isomerization takes place is continuously fed to a reaction vessel attached to a distillation column, said reaction vessel being heated and containing a mixture originally consisting essentially of (1) a complexed metal salt selected from the class consisting of cuprous chloride-benzonitrile complex, palladium chloride-benzonitrile complex, cuprous chloride-adiponitrile complex, and palladium chloride-adiponitrile complex, and (2) the organic compound used to complex the metal salt, said organic compound being selected from the class consisting of adiponitrile and benzonitrile and being present in amount greater than about 1% by weight of the total weight of the first composition, the complexed metal salt, and the organic compound, and in the reaction vessel continuously converting said first composition to a second composition which contains more 3,4-dichlorobutene-1 than 1,4-dichlorobutene-2 and which is continuously distilled overhead from the distillation column.

References Cited

UNITED STATES PATENTS 2,446,475  8/1942  Hearne et al. _____ 260—654

FOREIGN PATENTS 723,185  12/1965  Canada.
3,613  2/1967  Japan.

LEON ZITVER, Primary Examiner

J. A. BOSKA, Assistant Examiner

U.S. Cl. X.R.

252—429; 260—438, 429